United States Patent [19]

Shattles et al.

[11] 4,022,489
[45] May 10, 1977

[54] UNIVERSAL CURVED TOWBAR

[75] Inventors: Henry S. Shattles; John C. Abromavage, both of Tempe, Ariz.

[73] Assignee: Amerco, Inc., Phoenix, Ariz.

[22] Filed: May 14, 1976

[21] Appl. No.: 686,335

[52] U.S. Cl. .................... 280/491 E; 280/502
[51] Int. Cl.² ................................. B60D 1/14
[58] Field of Search ....... 280/491 E, 491 D, 491 R, 280/493, 494, 495, 500, 501, 502, 457, 458, 456 R

[56] References Cited

UNITED STATES PATENTS 3,806,162  4/1974  Milner ........................ 280/502

FOREIGN PATENTS OR APPLICATIONS 1,168,459  9/1958  France ........................ 280/495

Primary Examiner—Joseph F. Peters, Jr.
Assistant Examiner—John A. Pekar
Attorney, Agent, or Firm—David H. Semmes; Warren E. Olsen

[57] ABSTRACT

The universal curved towbar comprises a pair of curved arm assemblies which are pivoted upon a coupler assembly, and diverge to include bumper mounting assemblies on their distal ends. The curved arm assemblies lie in a lateral plane, with their convex surfaces facing each other, thereby allowing significantly improved clearance between the bumper of the towing vehicle and the arm assemblies themselves. At the distal ends of the curved arm assemblies are three distinct bumper engagement means, including a lower bumper clamping chain which is tensioned against an upper bumper clamp, together with a redundant tensioning through a safety chain attached to the frame of the towed vehicle. At the distal ends of the curved arm assemblies there is further provided a spreader bar assembly, which both adjustably maintains the bumper mounting assemblies in position, and adds significantly increased overall rigidity to the entire towbar assembly.

13 Claims, 7 Drawing Figures

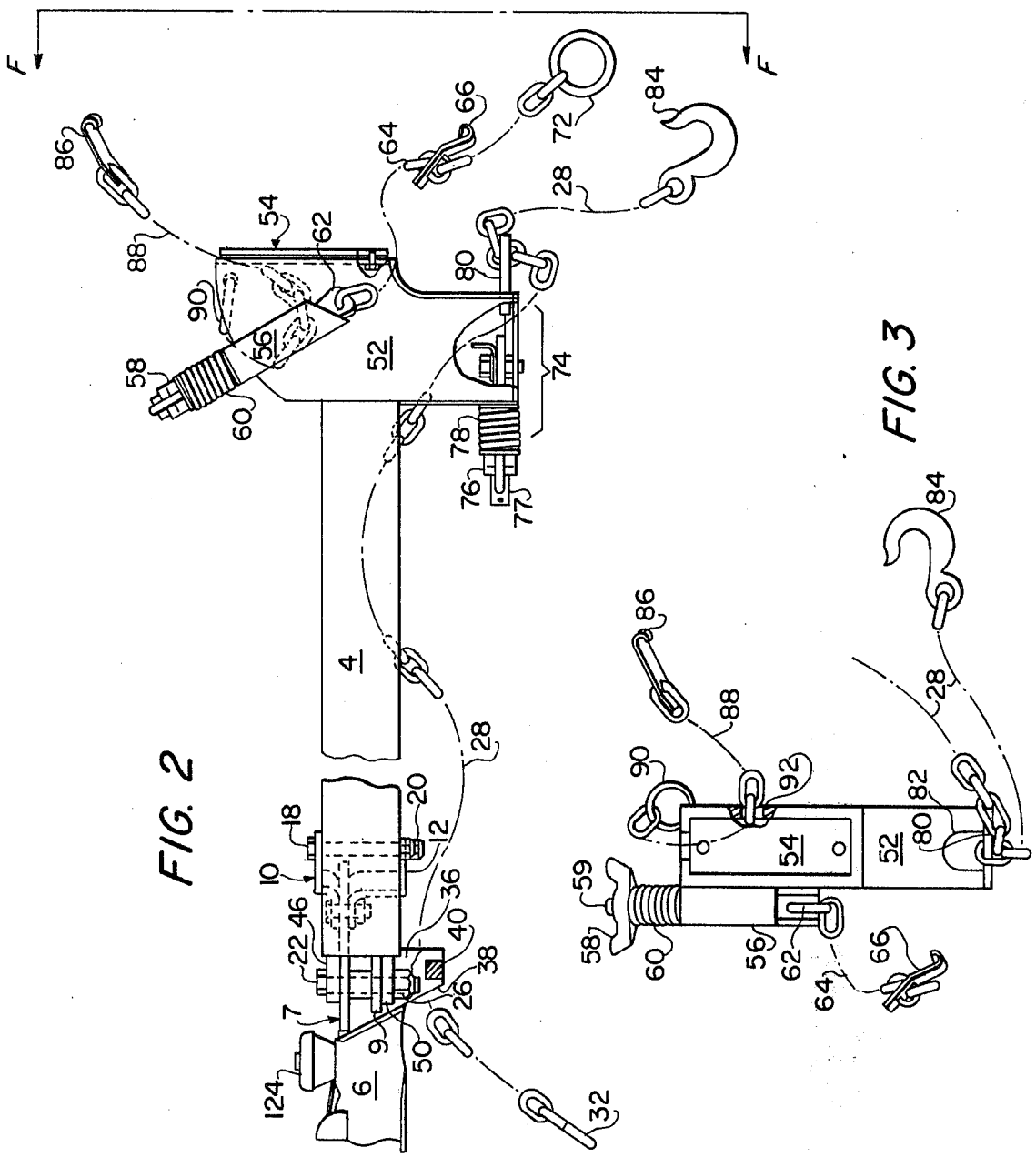

UNIVERSAL CURVED TOWBAR

BACKGROUND OF THE INVENTION

1. Field of the Invention

The present invention relates to towbars which are interconnectable between a towing vehicle and a towed vehicle, in order to maintain proper spacing between the vehicles. For this purpose there is taught herein a universal curved towbar assembly which will mount to any conventional coupler hall hitch, on the rear of a towing vehicle, with the bumper of the towed vehicle being maintained through the provision of a redundant clamping arrangement. The present invention teaches a structure of a triangulated tubular steel design, with curved arm assemblies on the left and right side, together with a spreader bar assembly between the bumper mounting assemblies. Significantly, the draft force between the vehicles is shared only by the arms and spreader bar structure, while there is a separately tensionable portion of the safety chain engageable upon the towed vehicle.

2. Description of the Prior Art

Numerous towbar constructions are known in the prior art, and representive of prior approaches are the U.S. Pat. Nos., as follows:

| | |
|---|---|
| FRANK | 3,860,266 |
| GAL | 3,737,177 |
| WOODKE | 3,649,049 |
| ORTIZ | 3,610,447 |
| HANSEN | 3,492,022 |
| HAYMAN | 3,083,040 |
| SAFFORD | 3,072,419 |
| HAWKINS | 3,000,652 |
| MILES | 2,840,392 |
| GENSINGER | 2,830,829 |
| ALBRECHT | 2,830,827 |
| KLEIN | 2,790,521 |
| GROSS | 2,672,353 |
| ROTH | 2,518,641 |
| KLEIN | 2,488,415 |
| ROGERS | 2,481,685 |
| JOHNSON | 2,306,388 |
| THORP | 2,306,007 |
| RODIN | 2,212,480 |

As will be more apparent hereinafter, the numerous towbar designs represented by these assembled patents do not begin to teach the specific advantages of the present disclosure. Specifically, none of these prior patents recognize advantages, which include, employing a pair of pivotable curved arms to allow the towing car's bumper to remain out of contact with the towbar assembly. Additionally, none of these exemplary prior patents include the redundant use of a frame safety chain, with a chain tensioning screws, so that the towed vehicle is securely held in a redundant fashion by the bumper clamps as well as the frame chain.

The patent to Frank represents a recent space-frame towbar assembly with the towing force being essentially applied to the frames of the respective vehicles. The spacing frame of Frank particularly avoids reliance on the bumpers, and requires careful adjustment of the chain assembly attached to the respective vehicle frames. As such, Frank does not recognize the use of a redundant frame chain in addition to a bumper clamping arrangement on the towed vehicle, nor does he teach any means for automatically ensuring that proper tensioning of the chains is assured.

The patent to Gal represents a vehicle towbar for small cars which also mounts directly to the frame of the towed vehicle, with the further points of attachment onto the bumper support bars. Therefore, Gal neither employs curved arm assemblies nor a redundant mounting arrangement as is taught by this disclosure.

The patent to Woodke similarly relies upon the bumper supports for tensioning a vehicle towbar, upward against the bumper, and is without any redundant mounting feature. While the arms of Woodke are adjustable, they are neither curved nor include the further feature of a spreader bar assembly for additional rigidity, as taught by this disclosure.

The patent to Ortiz similarly relies upon connecting a towed vehicle directly by mounting a chain assembly to the lower A-frame of the towed vehicle's front wheel assembly. The vehicle towbar of Hansen requires that the towed vehicle include two spaced part I members welded to the frame of the towed vehicle. As such, Hansen is not universal in application, and is further without recognition of the advantage of using curved arm assemblies.

The patent to Hayman employs conventional straight arm assemblies and does not suggest either the use of a spreader bar, or the use of a redundant attachment to the towed vehicle by a separately tensioning safety chain.

Safford, of common assignment with this invention, represents a single tensioning adjustment by using a frame chain together with flat pads for abutting the bumper of the vehicle to be towed. As such, Safford's early patent recognized neither a redundant mounting assembly, nor the advantages of the curved arm assemblies.

The patent to Hawkins illustrates a shock absorber, within a frame chain, to operate independently of the towbar. Hawkins' shock absorber is for the purpose of maintaining the rear end of the towing vehicle in contact with the ground. Significantly, Hawkins requires his tensioning chain to be attached to the towed vehicle at a point substantially below the points of attachment of the towbar assembly to the towed vehicle. As such, this triangulation effect is not equivalent to the redundant clamping assembly herein and, significantly, there is no recognition of the advantages of using curved arm assemblies within the towbar.

The patent to Miles illustrates a pivotable towbar wherein the sole clamping engagement on the towed vehicle arises from the use of a tensioned chain to maintain a support against the vehicle bumper. Again, there is no increased safety factor from a redundant clamping assembly, nor any recognition of the advantages of using curved arms for the towbar structure.

The foldable towing mechanism taught by Gensinger is a permanent towbar to be mounted upon a service car, and is without any structural or functional similarity to the present universal curved towbar assembly.

The patent to Albrecht merely represents a telescoping tube being used as a towbar, and is also without recognition of the advantages realizable by the present universal towbar assembly.

The towbar of Klein illustrates yet another towbar construction of the prior art, without further pertinence ot the present universal curved towbar assembly.

The patent to Gross, as well as the patents to Roth and the earlier patent to Klein, simply illustrates various known clamping assemblies for bumper mounted towbars. As such, they typify the prior art, and by contrast illustrate how the present universal curved towbar constitutes a significant improvement. The patent to Rogers represents a collapsible towbar which may be folded for storage. As such, it is categorically without functional or structural relationship to the present invention.

The early patent to Johnson illustrates an early towbar, which included a fulcrum so that the towed vehicle can be jacked up in an emergency.

The patent to Thorp represents a towbar in combination with a set of steering cables, attached to the steering knuckles of the towed vehicle. The steering cables provide a manner of turning the wheels of the towed vehicle, and do not constitute a redundant frame chain which can be tensioned upon the frame of the towed vehicle. Similarly, the patent to Rodin illustrates another form of automatic steering device as a part of a towbar.

SUMMARY OF THE INVENTION

The present invention relates to a towbar assembly, particularly a curved towbar assembly which is universal in its application. The present invention teaches a towbar which is comprised essentially of a coupling means, of the conventional ball socket type, which acts as interconnection of the towbar with the towing vehicle. Additionally, the coupling includes a rear plate for the pivotable mounting of a pair of curved arm assemblies. The curved arms are in a lateral plane, and are pivotable in the same lateral plane, where their respective convex sides of each curved arm are in a facing relationship. Therefore, the towbar of the present invention defines a concave configuration for the divergent arms, rather than the conventional straight arms as has been represented in the prior art, hereinabove.

The present invention is universal in that the manner of mounting the towbar to the towed vehicle requires nothing more than a conventional bumper and associated frame support members. Therefore, the present invention will tow any conventional vehicle, and this feature is particularly advantageous when the towbar is used primarily in a rental service purpose. A major drawback to prior art in towbars, in such a widely diverse rental application, is that the outer edge of the bumper of the towing vehicle may often contact the side face of a conventional straight towbar. According to the instant invention, the curved arm assemblies obviate this problem, insofar as they provide a concave recess in the vicinity of the locus of travel of the edge of the towing vehicle bumper. Therefore, one significant advantage of the present universal curved towbar assembly is the ability of the articulated vehicle, comprised by the towing vehicle and a towed vehicle, to effect backing and acute turning maneuvers without damage. This is significant because the damage which has been inherent in prior art towbar devices included not only damage to the towbar assembly itself, but also a resultant dislodgement of the clamping assemblies as attached to the bumper of the towed vehicle. Often times, the driver of the towing vehicle will jackknife the articulated vehicle combination and not realize that the structural integrity of the towbar, and its mounting, has been compromised. Therefore, it is a significant object of the present invention to provide a universal curved towbar assembly which will preclude impacts between the bumper of the towing vehicle and the towbar assembly during severe turning maneuvers.

According to the present invention, the distal ends of the curved towbars are provided with rigidly mounted bumper mounting assemblies. Significantly, each of these bumper mounting assemblies further comprises a first engagement means which is operable for releasably tensioning the mounting pad against the bumper and a second engagement means which is operable for releasably and adjustably tensioning, in opposition to the first engagement means, the mounting pad against the bumper. Redundant with the second engagement means is a third engagement means, which is essentially additive with the second engagement means, in that it adjustably tensions the mounting assembly against the towed vehicle's bumper through a novel interconnection between the safety chain, the bumper support of the towed vehicle, and the lower part of the bumper mounting assembly. This redundant mounting arrangement not only supplies a significantly increased safety factor to the overall combination, but has the further synergistic result of applying a moment of force which will resist the tendency of the towed vehicle to nose dive upon a sudden stopping of the articulated vehicle. According to the present invention, the normal draft forces inhering in a towing operation are carried by the curved arm assemblies, through the coupler assembly, to the conventional hitch on a towing vehicle. However, during stopping maneuvers, an additional moment of force is generated between the distal ends of the curved bar assemblies and the frame of the towed vehicle to oppose the dynamic forces which tend to make the towed vehicle nose dive.

A further advantage of the present invention, is the provision of a compression spring for the separate tensioning means for the lower bumper clamp and the tensioned safety chain interconnection between the towed vehicles frame and the bumper mounting assembly. With this arrangement, overtightening of the entire connection is eliminated, thus adding to the reliability and safety of the use of the present universal curved towbar assembly.

A further object and advantage of the present invention is the employment of a spreader bar assembly positioned proximate the distal ends of the curved arm assemblies. The spreader bar assembly both maintains an accurate alignment of the entire towbar assembly, and significantly strengthens the entire towbar assembly by making it a triangulated structure.

Other advantages of the towbar over the universal curved towbar of the present invention will be apparent from the detailed description which follows, in which reference is made to the accompanying drawings.

BRIEF DESCRIPTION OF THE DRAWINGS

FIG. 2 is a left side view, according to a preferred embodiment;

FIG. 3 is a rear view of the left bumper mounting assembly, according to a preferred embodiment;

DESCRIPTION OF THE PREFERRED EMBODIMENT

Figure 1:
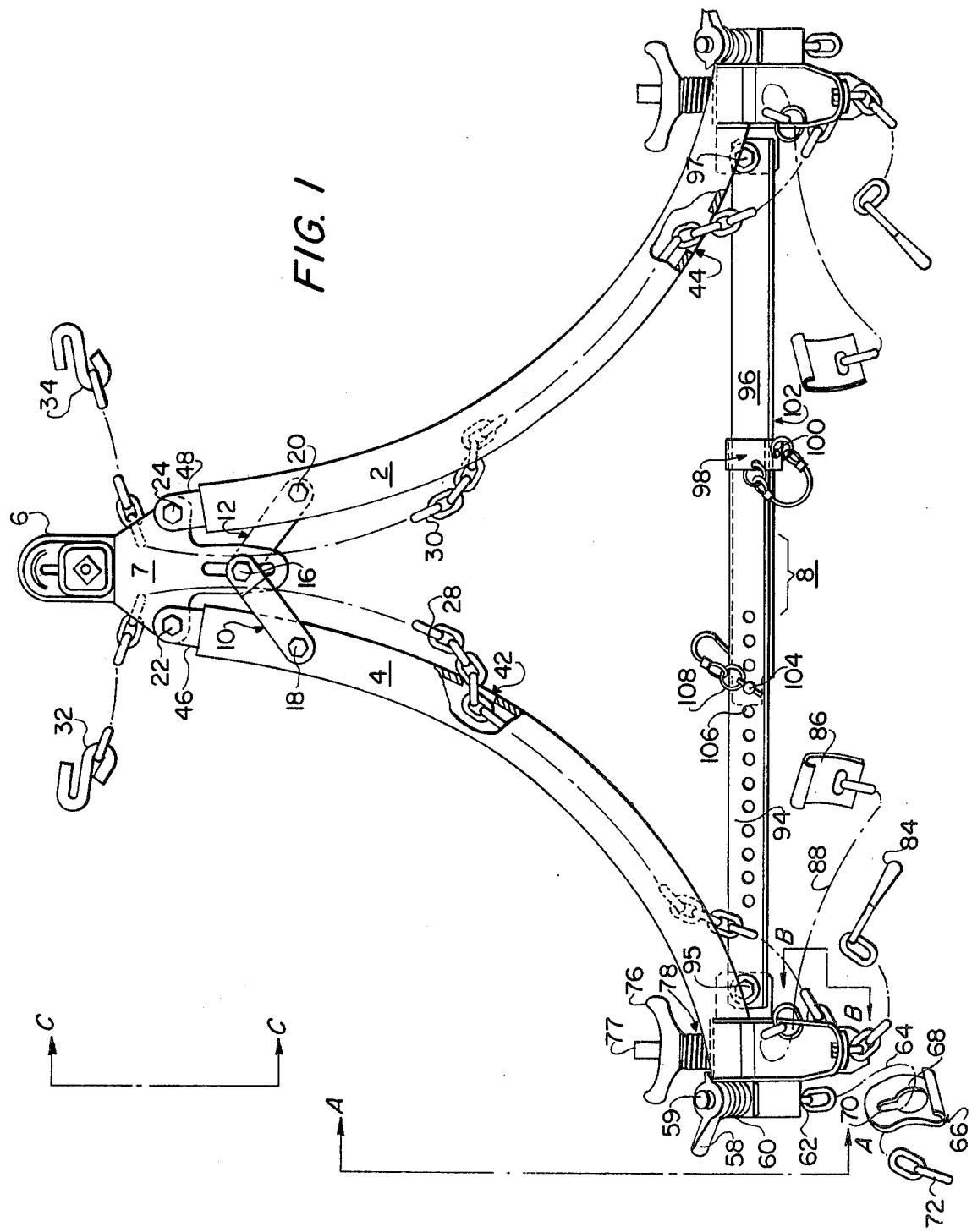
FIG. 1 is a top plan view of a peferred embodiment of the present invention, illustrating the major structural components.

The preferred embodiment is illustrated in top plan view, in FIG. 1, to essentially include a right curved arm assembly 2 and a left curved arm assembly 4, with each arm assembly pivotably mounted upon a conventional coupler assembly 6, with the entire device being finally triangulated by a spreader bar assembly 8. The coupler assembly 6 includes a conventional ball socket type recess on its underside, for securely mating the present invention to a towing vehicle hitch ball. According to the preferred embodiment, the coupler assembly 6 also includes a rearwardly extending upper mounting plate 7 which acts as a mounting structure for both the curved arm assemblies and the upper link 10, and the lower link 12. The two curved arm assemblies are pivotably mounted to the coupling means through a right arm mounting bolt 24, and a left arm mounting bolt 22. As illustrated in FIG. 1, the right curved arm assembly includes, at its proximate end, an extending mounting flange 48 which rests upon the coupler upper mounting plate 7, and similarly the left curved arm includes an extending mounting flange 46 at its proximate end. The mounting plate 7 is symmetrical about a centerline through the coupler ball socket 6, the centerline further extending in a longitudinal direction representing the normal application of draft forces.

The curved arm assemblies 2 and 4 lie in a common lateral plane, and can be seen to pivot about their respective mounting bolts within this lateral plane. Each of the curved arm assemblies 2 and 4 includes a vertical convex side which, respectively, are in a facing relationship. The opposite vertical sides of the curved arm assemblies are concave, as seen most simply in FIG. 1. According to the preferred embodiment, the curved arm assemblies are each constructed of square steel tubing, having wall thicknesses on the order of one-fourth of an inch and defining a hollow space within their arcuate lengths.

To articulate both curved arm assemblies about the longitudinal centerline of the device, there is provided an upper link 10 and a lower link 12, as most easily seen in FIG. 1. The upper link 10 has a first end which is bolted, at 18 through the left curved arm assembly 4, with its other end engaged in a longitudinal channel of the coupler plate 7 by a central link mounting bolt 16. Similarly, the right curved arm assembly 2 is connected at the lower end of the central link mounting bolt 16 and also at the bottom of the front curved arm assembly 2 by the lower link bolt 20. Consequently, the respective curved arms are articulated for cooperative movement, and any displacement of either curved arm assemblies will result in the concomitant symmetrical displacement of the other curved arm. The curved arm assemblies are articulated so there is no danger that a user of the present invention will inadvertently misalign the curved towbar as is being applied to the bumper of a vehicle to be towed. Because the links 10 and 12 are located near the proximate ends of their respective curved arm assemblies, the links are easily moved along the longitudinal channel, against the resistance applied by the central link mounting bolt 16, by a user holding the distal ends of the curved arms. It should further be noted that because the coupler mounting plate 7 is constrained by the left mounting bolt 22, the right mounting bolt 24 and then the central link mounting bolt 16, the coupler assembly itself will not be free to rotate if the curved arm assemblies 2 and 4 are maintained a fixed distance apart.

In order to maintain the curved arm assemblies 2 and 4 a fixed distance apart, the present invention further includes the spreader bar assembly 8 which comprises a pair of steel angles, with one end of either spreader bar being pivotable at the distal ends of each curved bar assembly. As shown most clearly in FIG. 1, the left spreader bar 94 is pivotably connected to a flange surface of the left curved arm assembly through bolt 95. Similarly, the right spreader bar 96 is pviotably mounted to the distal end of the right curved arm 2 through a bolt and flange arrangement, as shown at 97. The spreader bars may preferably be of angle steel, as shown in FIG. 1, and further include a spreader bar pin assembly 98 together with a registration pin 104. As illustrated, the left spreader bar further includes registration holes 106, to accommodate various positions of the spreader bar registration pin 104. As illustrated in FIG. 1 the left spreader bar 94 is located above and within the channel comprising the right spreader bar 96 with the spreader bar pin assembly 98 attached to the free end of the left spreader bar 94.

The spreader bar pin assembly 98, according to a preferred embodiment, includes a locking pin 100 which may be vertically inserted to preclude the rearmost vertical surface, 102, of the right spreader bar 96, from moving rearwardly relative to the corresponding surface of the left spreader bar 94. As shown for the preferred embodiment in FIG. 1, the registration pin 104 is a stud attached to the free end of the right bar, 96, and insertable through the bottom of the left spreader bar 94. With both the registration pin 104 and the spreader bar pin 100 in place, the entire assembly is exceptionally rigid. With the spreader bar so locked, in any adjustable position, the entire towbar is then essentially a triangulated structure, comprising the curved arms 2 and 4 and the spreader bar assembly 8. It should be also noted that the spreader bar 8 is located at the distal end of the curved arm asemblies, but is spaced forwardly of the portion of the upper mounting assemblies which contacts the outer surface of the bumper of the vehicle to be towed. Therefore, any various bumper configurations can be easily accommodated. With this arrangement, it should be noted, the respective curved arms can be easily repositioned simply by repositioning the spreader bar assembly, and symmetrical movement of both curved arm 2 and 4 is ensured by the articulation provided by the links 10 and 12. Additionally, because the links 10 and 12 are located near the proximate ends of the curved arm assemblies a moment applied against the distal end of the curved arm assemblies will easily overcome the friction between the links 10 and 12 and the coupler mounting at 7, as adjusted by the central link mounting bolt 16.

Having now explained the essential structural interrelationships of the main components of the towbar assembly, an understanding of the present invention requires consideration of the interrelationship of the respective left safety chain 28, and the right safety chain 30, within the overall combination. As shown most clearly in FIG. 1, the left safety chain is one continuous link of chain which includes a towing vehicle hook 32 at one end and a towed vehicle hook 84 at the opposite end. Since both safety chains 28 and 30 function within the present combination in a completely symmetrical fashion, further description will be directed towards the left safety chain 28, with the understanding that a completely analogous mounting is intended for the right safety chain 30. While the terminology "safety chain" has been adopted herein, it should be understood that ICC regulations require a cross chain, between the towing vehicle and the towed vehicle, which is separate from a normal engagement means provided between the vehicles by any towbar design. As shown in FIG. 1, the left safety chain 28 and the right safety chain 30 may of course be crossed in the vicinity of the coupler 6, for example, so that the towing vehicle hook 34 would engage a portion of the towing vehicle frame to the left of the point of attachment of the towing vehicle hook 32. In any event, it should be appreciated that the representative safety chain 28 comprises a continuous chain interconnection between the two vehicles comprising the overall articulated vehicle. As such, the safety chain itself acts as a separate means of interconnecting these two vehicles against any eventuality.

It can be seen from FIG. 1 that the left curved arm assembly 44 includes a left safety chain arm entry aperture 42 which allows for free movement of the safety chain 28 inside of the tubular curved arm assembly 4. The chain entry aperture 42 may simply be a circular hole within the convex inner surface of the curved arm assembly, sufficient to allow for the free movement of the chain 28 therethrough. A corresponding exit aperture is provided within the convex inner side of each respective curved arm assembly, as illustrated in partial section at 44 in FIG. 1. Hence, each safety chain is maintained loosely supported between the towing vehicle hook 32 and the upper mounting assemblies and, therefore, prevented from hanging so low as to drag upon the road surface. It can be appreciated that the left safety chain 28 is not tensioned between the hook 32 and its releasible connection with the movable tensioning member 80, as illustrated in FIG. 2. Therefore, no draft forces will be transmitted directly by this safety chain to the towing vehicle; only a portion of the safety chain will be employed to redundantly mount the present towbar to the bumper of the vehicle to be towed.

With reference to FIG. 2 it can be seen that the left curved arm assembly 4 includes a left bumper assembly 52 at its distal end. Additionally, in FIG. 2 the passage of the safety chain within and without the left curved arm assembly 4 is illustrated to include a rest bar 40 which is laterally spaced on the coupler assembly, below the point of pivotable attachment to the curved arms. The curved arm 4 is further illustrated in FIG. 2 to have a lower mounting flange 50 which is positioned below a corresponding flange, 9, on the coupler 6. Therefore, the left arm mounting bolt 22 may securely mount the coupler to the curved arm by the tightening of a mounting bolt, as at 26. Extending downwardly from the coupler mounting plate 7 may be a pair of vertical coupler assembly plates, 36 and 38, for both supporting the flange connection of the curved arms and defining an open space above the safety chain rest bar 40, extending therebetween. The left vertical coupler assembly plate 36 will, therefore, both supply a structural member for the left arm mounting bolt 22 and prevent the safety chain from laterally slipping off the rest bar 40.

Again with reference to FIG. 2, details of the left bumper mounting assembly 52 can be further appreciated. The representative left bumper mounting assembly 52 is welded or otherwise affixed to the left curved arm assembly 4, to constitute the distal end thereof. The left bumper mounting assembly 52 includes a vertical and rearwardly facing bumper pad 54 together with three independent mounting means for the bumper assembly onto the bumper of a vehicle to be towed.

The first engagement means comprises an open ring retainer 90 which secures one end of the upper bumper hook chain 88 against loss. The upper bumper hook chain 88 extends within the hollow upper mounting assembly 52 and through an upper bumper chain locking aperture 92. This locking aperture 92 comprises a circular section together with a radially extending narrowed aperture for the purpose of locking any given link along the length of a chain. This locking aperture is similar in all respects to the aperture within the lower bump hook 66, as illustrated in FIG. 1. As shown in FIG. 1, the lower bumper hook 66 includes a chain passing aperture 68 together with a radially extending chain locking aperture 70. While a chain may pass through the portion 68, inserting a link sideways into the aperture 70 securely precludes further passage of the chain therethrough. While this type of chain linking aperture is known, per se, its use has been found particularly convenient within the preferred embodiment of the present invention.

Again with reference to FIG. 2, the first engagement means therefore includes an adjustably positionable upper bumper hook chain 88 with an upper bumper hook 86 at its other end. This first engagement means is positioned at the top of the vertically extending left bumper mounting assembly 52 for the purpose of applying a downwardly directed tension upon the upper flange of a bumper, as will be hereinafter more particularly described.

The left bumper mounting assembly 52 further includes a threaded bolt tensioner assembly 56 as part of the second bumper engagement means. The lower bumper tensioner assembly 56 includes a housing which extends downwardly and outwardly on the side of the assembly housing 52, with a lower bumper hook chain 64 connected thereto. The lower bumper chain 52 is illustrated, in its preferred embodiment, to have a lower bumper hook 66, which is provided with a locking aperture as hereinabove discussed. The other end of the chain 64 is provided with a chain bolt, or hog ring, to preclude loss of the lower bumper hook 66. The lower bumper mounting chain 66 is therefore tensioned upwardly against a lower bumper flange, through the provision of a wing handle 58 which will urge a drive screw 59 outwardly inside the tensioner housing 56. As the wing handle 58 is turned, it compresses a spring as the drive screw 59 is moved upwardly and inwardly. At FIG. 3 the compression spring is shown in the uncompressed position 60.

It can now be appreciated that the left bumper pad 54 will be urged against the surface of the towed vehicle's bumper by the positioning of the upper bumper hook 86 over the top portion of the bumper flange, together with the tensioning of the lower hook 66 against the lower flange of the bumper. As such, this first and second bumper engagement means is adequate to securely urge the left bumper pad 54 against the outer bumper surface. However, according to the present invention an additional synergistic result is realized through the provision of a third, redundant, tensioning means for manfiestly secure engagement of the bumper pads against the bumper surface.

The third engagement means is also operable for releasably and adjustably tensioning the bumper surface 54 against the bumper, and operates redundantly with the above described second engagement means provided through the assembly 56. As shown in FIGS. 2 and 3, the left safety chain 28 is not tensioned between the hook 32 and the movable tensioning member 80. The third engagement means includes a second wing handle 76, threadably engaged upon the longitudinally positioned bolt 77, together with a spring between the housing 52 and the wing handle 76. As shown in FIG. 2 the spring 78 is shown in its uncompressed position. The movable actuator member 80 is essentially an extension of the longitudinally threaded bolt 77, though it is shown in partial section in FIG. 2. The connector 80 similarly includes a locking aperture, as hereinbefore described and shown in FIG. 1 with respect to hook 66, for the purpose of engaging a portion of the safety chain 28 between the actuator 80 and the towed vehicle hook 84. As shown in FIG. 3, the safety chain 28 extends from the exit aperture in the left curved arm assembly 4 and is continuous to the towed vehicle hook 84. The safety chain 28 is passed through the locking aperture in the connector 80, not illustrated, with a corresponding clearance space for this safety chain within the housing 52 being illustrated at 82. The third engagement means is positioned at the bottom of the vertically extending housing 52, below the lateral plane of the curved arm assemblies for the purpose which will hereinafter be apparent. To facilitate the operation of the present curved towbar assembly, FIGS. 4–6 illustrated the mounting of a towbar according to the present invention.

Figure 4:
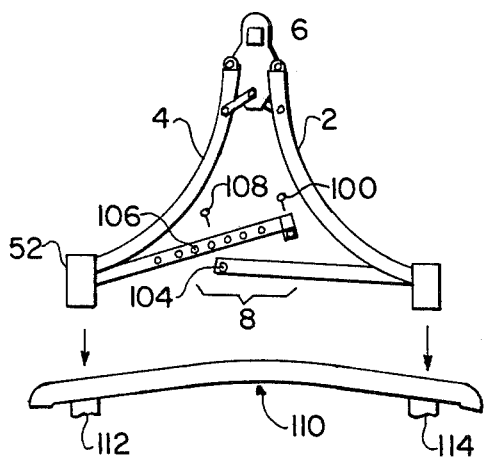
FIG. 4 is a schematic representation of the initial adjustment of a preferred embodiment upon a vehicle to be towed.

FIG. 4 is a schematic representation of the alignment of the present invention upon the bumper of the vehicle to be towed. This bumper is designated 110, and includes a left bumper support 112 and a right bumper support 114. In operation, the spreader bar assembly 8 is adjusted, to align the bumper mounting assembly 52, for example, directly opposite the left bumper support 112 on the towed vehicle. Once this alignment has been accomplished, simply by spreading the spreader bar assembly 8, the registration pin 104 may be inserted through the appropriate registration hole 106, and secured by inserting a locking pin 108 through pin 104. Thereafter, the respective spreader bars will be nested together, and the spreader bar pin 100 may be inserted to further secure the spreader bar in a locked position.

Figure 5:
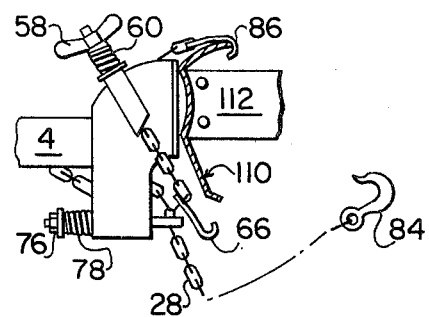
FIGS. 5 and 6 are a schematic representation of the following sequence of mounting a preferred embodiment of the invention.
Figure 6:
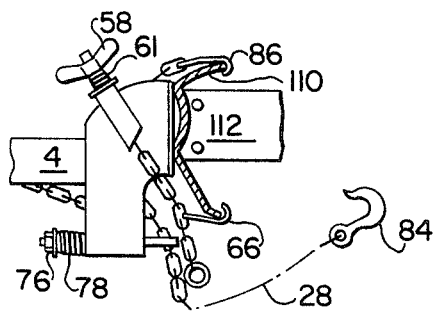

With reference to FIG. 5, the thusly aligned left mounting assembly 52 is initially held against the bumper 110 by adjustably positioning the upper bumper mounting hook 86 over the topmost flange on the bumper. At this point the entire towbar assembly may be vertically raised or lowered by adjusting the upper mounting hook and chain for the best contact between the mounting assembly pad and the bumper surface. At this time the second engagement means is not engaged, with the wing handle fully extended so the spring is shown in its uncompressed position at 60. Similarly, the third engagement means is positioned so the wing handle 76 is fully extended and the spring is uncompressed, as shown at 78. The safety chain 28 may then be loosely pulled to the entrance and exit apertures within the left curved arm assembly 4 leaving the towed vehicle frame hook 84 similarly unconnected. At this point, the towbar is sufficiently supported on the bumper, solely by the upper bumper hooks 86, so that the towing vehicle may be backed into position and interconnected with the coupler 6.

Figure 7:
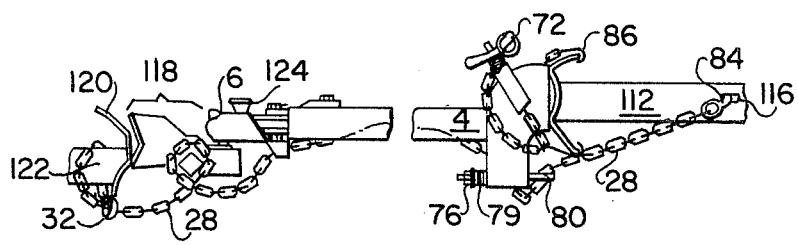
FIG. 7 is a schematic illustration of an application of the preferred embodiment to form an articulated vehicle.

As shown in FIG. 7 the lower bumper clamp 6 may now be extended over the lower lip of the bumper and tightened in opposition to the first engagement means through wing handle 58. As shown in FIG. 6 the spring is shown in its compressed position 61. Because the spring 61 may not be further compressed, the bumper mounting pad will be urged against the bumper with a tension which is pre-selected by the spring factor for the compressed spring 61. At this point the third engagement means, comprised by the wing handle 76 and the compression spring is now mounted, with the compression spring shown in its uncompressed position 78. The final mounting of the preferred embodiment is illustrated in FIG. 7. To engage the third engagement means, the left safety chain 28 is slackened enough so that the chain passes freely through the towbar structure, to allow the hook 84 to be inserted into an appropriate part of the frame 112, such as the opening shown at 116. With the hook 84 thusly secured around the frame of the vehicle, the redundant tensioning of the entire assembly may now be accomplished.

With the hook in position, the chain 28 is pulled and locked into the locking aperture within the movable connector 80. The wing handle 76 is tightened until the spring is compressed to its fully compressed position, shown at 79 in FIG. 7. With the portion of the safety chain 28 between the connector 80 and the towed vehicle frame 112 thusly tensioned, a further tension will be exerted against the force exerted through the upper bumper mounting hook 86. Significantly, because the safety chain at 84 is hooked inwardly from the bumper, a larger moment may be applied against the bumper mounting pad than the moment applied by the wing handle 58 comprising the second engagement means. With the safety chain thusly tensioned along the portion of its length, the excess portion of the chain 28 is pulled through the apertures in the arm assembly 4 so that the chain is not allowed to drag upon the ground between the bumper attachment and the coupler 6. While FIG. 7 illustrates a conventional bumper hitch 118, upon a conventional bumper 120 of the towing vehicle, these elements are merely for illustrative purposes, and are in no way requisite to an understanding of the present invention. As the safety chain extends outwardly from the coupler 6, it may be conveniently crossed and wrapped around a corresponding body member of the towing vehicle, and there secured by the towing vehicle hook 32.

With the illustrative application as shown in FIG. 7, it can be appreciated that if the towing vehicle were to suddenly stop, there would be a tendency for the front end of the towed vehicle to nose-dive. However, because of the additional redundant tensioning of the safety chain 28 between the connector 80 and the frame at 116, such moments will be effectively resisted without the danger of dislodging the lower bumper hook 66 or otherwise deforming the bumper of the vehicle that is being towed. Consequently, the present mounting arrangement provides for a particularly safe interconnection of two vehicles, one which avoids both the inadvertent damage to the assembly from a jackknifed orientation, and damage to the assembly from sudden stops by the towing vehicle.

From the foregoing, various other features, advantages, objectives, adaptations and rearrangements of the disclosed universal curved towbar assembly will be apparent to those skilled in the art, however, it is understood that the invention itself is solely to be limited to the scope of the appended claims.

We claim:

1. A universal curved towbar assembly, operable for engaging the bumper of a vehicle to be towed, comprising, in combination:
   A. a coupling means, of the ball socket type; and
   B. a pair of curved arm assemblies each including a convex side and diverging, in a lateral plane, from said coupling means, wherein the respective convex sides of said curved arm assemblies are in a facing relationship, each of said curved arm assemblies having a proximate end pivotably secured to said coupling means and a distal end including a bumper mounting assembly; wherein
   C. said each bumper mounting assembly further comprises a bumper mounting pad surface, and,
      i. a first engagement means, operable for releasably tensioning said mounting pad against a bumper, and
      ii. a second engagement means, operable for releasably and adjustably tensioning, in opposition to said first engagement means, said mounting pad against said bumper; and
      iii. a third engagement means, operable for releasably and adjustably tensioning redundantly with said second engagement means, said mounting pad against said bumper; and
   D. spreader bar means, extending laterally between the respective distal ends of said curved arm assemblies, operable for aligning said mounting assemblies with respect to said bumper.

2. A universal curved towbar assembly, as in claim 1, wherein each of said curved arm assemblies further comprises a hollow wall construction, and said third engagement means comprises a portion of a safety chain partially carried within each of said hollow arm assemblies.

3. A universal curved towbar assembly as in claim 2, wherein safety chain entrance and exit apertures are spaced along the convex sides of each of said curved arm assemblies.

4. A universal curved towbar assembly as in claim 2 wherein said coupler means further includes a safety chain rest below the proximate ends of said curved arm assemblies.

5. A universal curved towbar assembly as in claim 4 wherein said each safety chain is a continuous chain which includes a towing vehicle hook at one end and a towed vehicle hook at its other end, and said third engagement means comprises a longitudinal tensioning screw operable to tension a portion of each of said safety chains between said bumper mounting assemblies and a support member for said bumper of the towed vehicle.

6. A universal curved towbar assembly as in claim 1, wherein said first engagement means comprises a chain operable for engaging a top flange of said bumper, said second engagement means comprises a chain operable for engaging a bottom flange of said bumper, and said third engagement means comprises a portion of a safety chain operable for engaging a support member for said bumper.

7. A universal curved towbar assembly as in claim 6 wherein said each bumper assembly further comprises a vertical housing, extending above and below the plane of said curved arm assemblies, wherein said first engagement means includes a chain locking aperture proximate the top of said housing, the second engagement means further comprises a first threaded bolt chain tensioning assembly proximate the middle of said housing, and the third engagement means further comprises a second threaded bolt chain tensioning assembly proximate the bottom of said housing.

8. A universal curved towbar assembly as in claim 7 wherein said first threaded bolt chain tensioning assembly comprises a longitudinally threaded bolt, angled downwardly and outwardly, with a chain rigidly connected at its downward end, the other end of said chain including a lower bumper hook further including a chain locking aperture.

9. A universal curved towbar assembly as in claim 8 wherein said second threaded bolt chain tensioning assembly comprises a longitudinally threaded bolt, extending rearwardly, with a chain locking aperture at its rear end, operable for locking said safety chain, and a towed vehicle frame hook operable for further tensioning said bumper assembly.

10. A universal curved towbar assembly as in claim 9 wherein each of said threaded bolt chain tensioning assemblies further includes a wing handle and a compression spring around said threaded bolt, wherein said compression spring is between said wing handle and a housing for each of said threaded bolt chain tensioning assemblies.

11. A universal curved towbar assembly as in claim 1, wherein the proximate end of each of said curved arm assemblies further includes a link pivotably connected between said curved arm and a symmetrically disposed elongated channel on said coupler assembly, whereby said curved arms are articulated symmetrically about said coupler assembly.

12. A universal curved towbar assembly as in claim 11, wherein said spreader bar means further comprises a first bar pivotably mounted, at one end, to the distal end of one of said curved arm assemblies and a second bar pivotably mounted, at one end, to the distal end of the other curved arm assembly.

13. A universal curved towbar assembly as in claim 12 wherein said first and second spreader bars further include registration means, and pin means for adjustably connecting said bars to define the spacing of the distal ends of said curved arm assemblies.

* * * * *